United States Patent
Kilbey

(10) Patent No.: US 11,650,017 B2
(45) Date of Patent: May 16, 2023

(54) DUPLEX THERMAL TRANSFER PACK

(71) Applicant: Bryan E. Kilbey, DeFuniak Springs, FL (US)

(72) Inventor: Bryan E. Kilbey, DeFuniak Springs, FL (US)

( * ) Notice: Subject to any disclaimer, the term of this patent is extended or adjusted under 35 U.S.C. 154(b) by 0 days.

(21) Appl. No.: 16/442,965

(22) Filed: Jun. 17, 2019

(65) Prior Publication Data

US 2020/0393205 A1 Dec. 17, 2020

(51) Int. Cl.
*A41D 13/005* (2006.01)
*F28D 20/02* (2006.01)
*F28D 20/00* (2006.01)
*A41D 1/04* (2006.01)
*G01K 11/12* (2021.01)

(52) U.S. Cl.
CPC ............ *F28D 20/026* (2013.01); *A41D 1/04* (2013.01); *G01K 11/12* (2013.01); *A41D 2300/20* (2013.01); *A41D 2300/32* (2013.01); *F28D 2020/0082* (2013.01)

(58) Field of Classification Search
CPC ..... F28D 2020/0008; F28D 2020/0021; F28D 2020/0026; F28D 2020/0006; F28D 20/21; F28D 20/23; F28D 20/26; A41D 13/005; A41D 13/0053; A41D 13/0058; A61F 2007/0233; A61F 2007/0234; A61F 2007/0292; A61F 2007/0277; A61F 2007/108
USPC ...................................................... 165/11.1
See application file for complete search history.

(56) References Cited

U.S. PATENT DOCUMENTS

| | | | | |
|---|---|---|---|---|
| 4,580,408 A | * | 4/1986 | Stuebner | A41D 13/0056 2/2.5 |
| 4,931,333 A | * | 6/1990 | Henry | B65D 81/09 428/76 |
| 5,069,208 A | * | 12/1991 | Noppel | A61F 7/106 607/114 |
| 5,146,625 A | * | 9/1992 | Steele | A41D 13/0055 2/102 |
| 5,415,222 A | * | 5/1995 | Colvin | F28D 20/02 165/46 |
| 5,843,145 A | * | 12/1998 | Brink | A61F 7/02 607/114 |
| 5,944,089 A | * | 8/1999 | Roland | F28D 20/021 165/10 |
| 6,083,256 A | * | 7/2000 | Der Ovanesian | F28D 20/02 607/114 |
| 6,319,599 B1 | * | 11/2001 | Buckley | A41D 31/065 428/308.4 |
| 7,997,293 B2 | * | 8/2011 | Ruschke | F16K 15/144 137/43 |
| 8,105,371 B1 | * | 1/2012 | Giocondo, Jr. | A41D 1/04 607/108 |

(Continued)

*Primary Examiner* — Frantz F Jules
*Assistant Examiner* — Jason N Thompson
(74) *Attorney, Agent, or Firm* — J. Wiley Horton

(57) ABSTRACT

The present invention comprises a duplex thermal transfer pack. The pack includes a large bag containing many smaller sub bags. Each sub bag contains plain water. The volume within the large bag but outside the sub bags contains a second substance. This second substance freezes with a consistency akin to crushed ice or packed snow. The second substance allows the thermal transfer pack to remain malleable even when its contents are frozen.

20 Claims, 18 Drawing Sheets

(56) References Cited

U.S. PATENT DOCUMENTS

| | | | |
|---|---|---|---|
| 2005/0230084 A1* | 10/2005 | Wang | F28D 20/02 165/100 |
| 2009/0076575 A1* | 3/2009 | Noel | F28D 20/026 607/113 |
| 2014/0309750 A1* | 10/2014 | Kelley | A61F 2/7812 623/33 |
| 2016/0135517 A1* | 5/2016 | Silverberg | A41D 13/005 2/93 |
| 2016/0198776 A1* | 7/2016 | Stevens | A41D 13/0058 219/211 |
| 2017/0007444 A1* | 1/2017 | Vogel | A61F 7/10 |
| 2019/0008676 A1* | 1/2019 | Kilbey | A41D 1/04 |

* cited by examiner

DUPLEX THERMAL TRANSFER PACK

CROSS-REFERENCES TO RELATED APPLICATIONS

None.

STATEMENT REGARDING FEDERALLY SPONSORED RESEARCH OR DEVELOPMENT

This application is a continuation-in-part of U.S. patent application Ser. No. 15/645,206

MICROFICHE APPENDIX

Not Applicable

BACKGROUND OF THE INVENTION

1. Field of the Invention

This invention relates to the field of garments. More specifically, the invention comprises a thermal transfer pack that may be affixed to a garment or brace.

2. Description of the Related Art

Outer garments have long been used to regulate heat transfer from a human wearer. Most garments serve to reduce heat loss on cold days, and vests have been used for this purpose for many years. In more recent times some garments have been used to absorb heat from the wearer. In the field of sports medicine, it is now well understood that pre-cooling an athlete enhances performance during an event. In addition, cooling an athlete immediately after an event often aids in recovery.

In the pre-cooling scenario, the body's core temperature must be reduced. As the human body seeks at all times to maintain a fixed core temperature, a substantial heat transfer is required to create the desired reduction. An outer garment may be used to locate a suitable beat transfer medium against the user's torso. The temperature of the transfer medium must be significantly below the user's skin temperature. However, a temperature difference that is too great will cause tissue damage. The use of a garment-based heat transfer mechanism therefore presents the competing concerns of (1) a temperature difference that is great enough to transfer sufficient heat, and (2) a temperature difference that is small enough to avoid tissue damage.

A heat transfer medium that undergoes a phase change offers advantages. First, the use of a phase change allows the absorption of much more heat that would be possible in its absence. Second, the use of a phase change provides a steady temperature for the heat transfer medium as it is transitioning from a solid to a liquid (the temperature of a substance being constant in that process).

One suitable heat transfer medium is disclosed in U.S. Pat. No. 5,800,491 to Kolen and Nebolon. This patent discloses a composition of discrete hydrophilic absorbers that are hydrated with a liquid comprising a solution of water and a humectant selected from the group consisting of propylene glycol, ethylene glycol, glycerin, dimethyl sulfoxide, dimethyl formamide, and combinations thereof. The hydrophilic absorbers are discrete acrylic polymer granules, such as discrete cross-linked polyacrylamide copolymer granules. Upon freezing, this composition creates a solid state that is akin to packed snow or crushed ice. It remains pliable instead of freezing into a unified solid mass. More recent developments regarding this type of heat transfer medium are disclosed in U.S. Pat. No. 9,039,747 to Nebolon and Gardner.

It is known in the art to provide heat transfer packs such as disclosed in the '491 and '747 Patents. These packs are typically placed in a pocket formed as part of a securing wrap or garment. These have been used in medical applications for cooling therapy (such as following knee surgery). Recently such packs have been used for pre-cooling in the field of sports medicine, post cooling to aid in recovery, and precooling for high heat environments.

Beyond the field of athletics, research data now indicates that human performance is adversely affected by heat in many different environments. For example, industrial production facilities often have elevated ambient temperatures. Some facilities operate with ambient temperatures between 32 and 40 degrees centigrade (90 and 104 degrees Fahrenheit). A metal forging factory experiences this range of temperatures, particularly in the summer.

The human body can tolerate these temperature indefinitely, but it is now understood that performance will be adversely affected. This degradation leads to lower productivity, cognitive performance loss, and even an increase in workplace accidents. In fact European regulatory agencies are now considering restricting the length of exposure to such temperatures.

A heat transfer garment can enhance the productivity of workers in these high-heat environments. A suitable garment can allow a human operator's core temperature to remain normal even when the operator is surrounded by a hot environment.

Of course, the effects of cold temperatures on human performance may be just as pronounced. In cold environments it may be desirable to provide a garment that actually transfers heat to the wearer (as opposed to simply reducing the heat loss rate from the wearer).

The present invention provides a heat transfer garment that may be used to enhance human performance in many applications.

BRIEF SUMMARY OF THE PRESENT INVENTION

The present invention comprises a duplex thermal transfer pack that may be used to absorb heat or for other purposes. The thermal transfer pack is configured to be attached to a garment or orthotic. An exemplary use is a vest configured to mount a plurality of heat transfer packs on its interior surface. Such a vest will be used to provide the context of the present invention, but the reader should bear in mind that the inventive thermal transfer packs may be used in many other applications.

The duplex thermal transfer pack includes a large bag containing many smaller sub bags. Each sub bag contains plain water. The volume within the large bag but outside the sub bags contains a second substance. This second substance freezes with a consistency akin to crushed ice or packed snow. The second substance allows the thermal transfer pack to remain malleable even when its contents are frozen.

Figure 11:
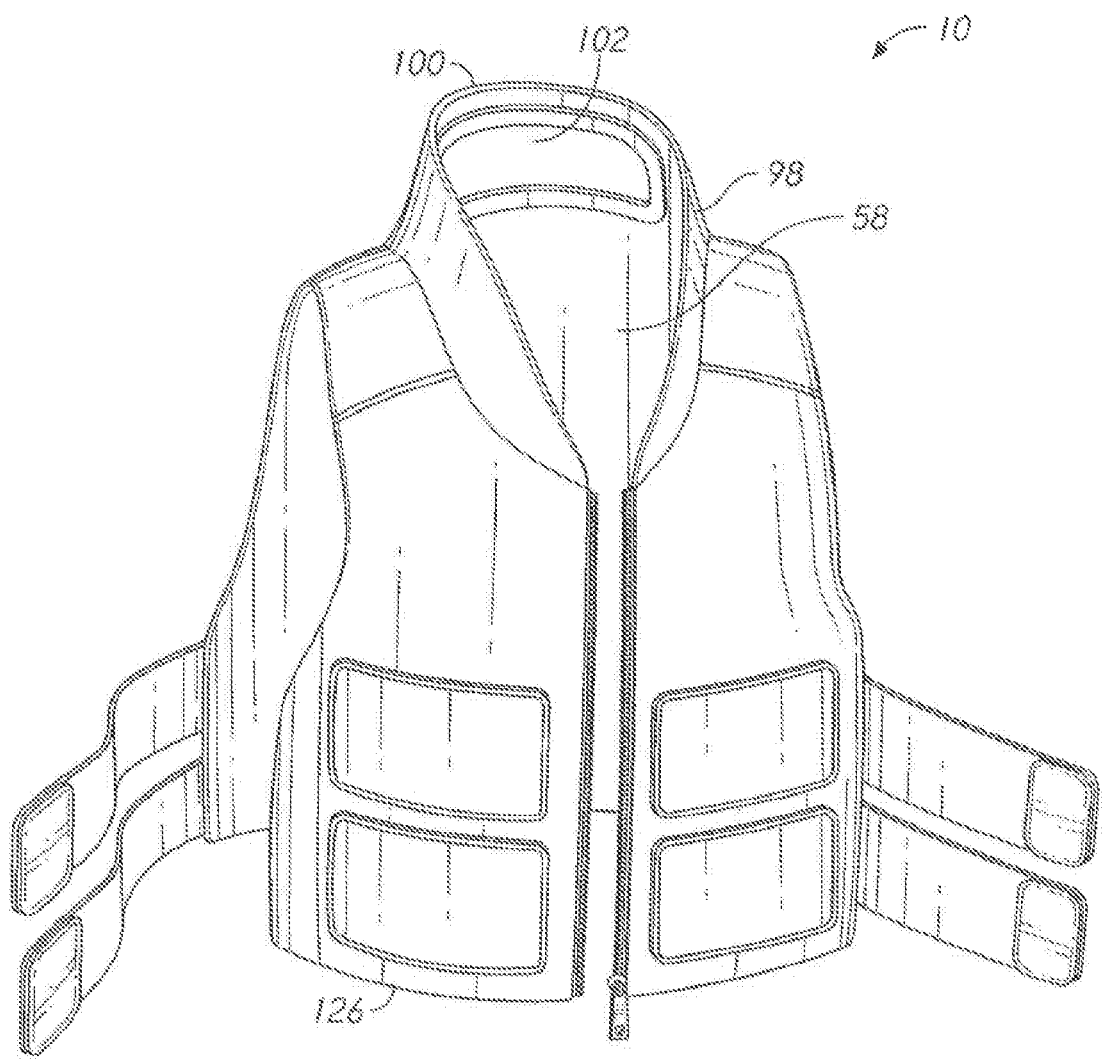
FIG. 11 is a perspective view, showing an alternate embodiment of the inventive vest with an elevated posterior neck portion.

REFERENCE NUMERALS IN THE DRAWINGS 10 heat transfer vest
12 neck relief
14 left yoke panel
16 right yoke panel
18 left front panel
20 right front panel
22 left front lateral extension
24 right front lateral extension
26 left arm relief
28 right arm relief
30 exterior surface
32 left upper loop panel
34 left lower loop panel
36 right upper loop panel
38 right lower loop panel
40 zipper
42 vertical break
44 hook panel
46 upper strap
48 lower strap
50 hook panel
52 hook panel
54 hook panel
56 slider body
58 interior surface
59 user
60 overlap
62 thermal transfer pack
64 valve
66 hook panel
68 sealed perimeter
70 interior
72 heal transfer medium
74 sealing material
76 cover material
78 left upper aide pack
80 side pack
82 upper back pack
84 back pack
86 outline
88 label
90 exterior layer
92 insulating layer
94 reflective layer
96 loop material
98 shawl collar
100 elevated posterior edge
102 cranial pack
104 neck covering collar
106 loop tab
108 hook panel
110 sub jaw edge
112 opening
114 snap closure
116 carotid bag
118 waterproof layer
120 evaporative layer
122 sub-bag
124 composite thermal transfer bag
126 lower edge [It is used on FIG. 11 and in text description]
128 first panel
130 second panel
132 outer surface
134 inner surface
136 indicating area
138 sealed perimeter
140 water
142 transparent surface

DETAILED DESCRIPTION OF THE INVENTION

Figure 1:
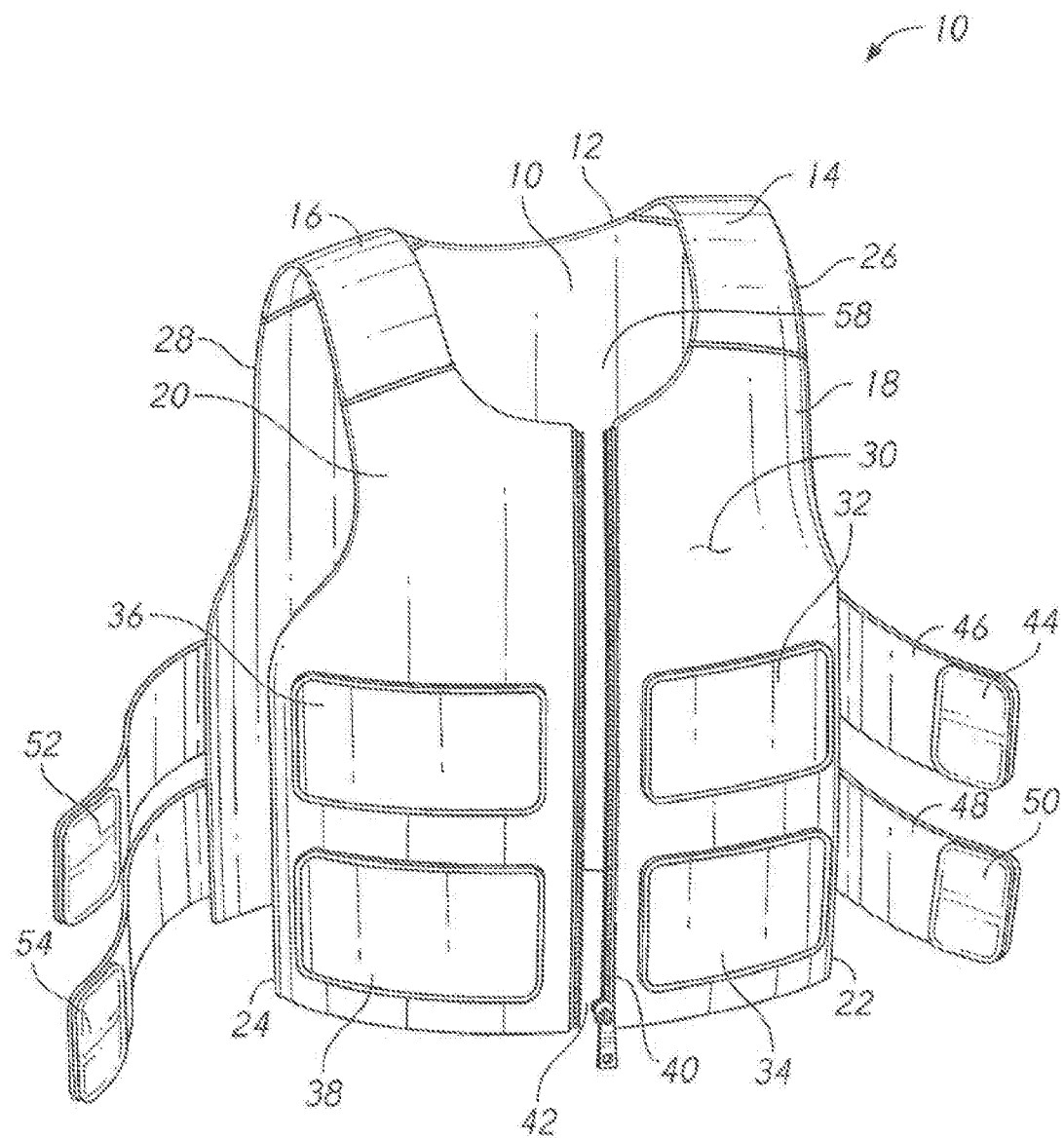
FIG. 1 is a perspective view, showing the inventive vest.

FIG. 1 shows a perspective view of a preferred embodiment of the present invention. Heat transfer vest 10 may be used to absorb heat from a wearer/user or transfer heat to a wearer/user. Those skilled in the art will know that a vest may be constructed in a variety of ways. The version shown in FIG. 1 should not be viewed as limiting the invention to any particular example.

Back panel 10 is configured to rest against the user's back. Left front panel 18 and right front panel 20 are configured to rear, against the anterior portion of die user's abdomen and chest. Left and right yoke panels 14, 16 pass over the user's shoulders and joint the left and right front panels 18,20 to back panel 10. Seams are shown where these various panels are joined, but seams will not always be present. In some versions the vest may be made of one contiguous panel or some other configuration of multiple panels.

The two front panels meet at vertical break 42, which is selectively closed using zipper 40. Right front panel 20 includes right front lateral extension 24. Left front panel 18 includes left front lateral extension 22. The two lateral sides of back panel 10 preferably include lateral extensions as well. Left arm relief 26 and right arm relief 28 lie above the region of the lateral extensions.

The lateral extensions are configured to overlap in order to adjust the overall circumference of the vest when it is donned by a user. The vest preferably includes adjustable securement mechanisms so that it can fit a wide variety of users. In the version shown in FIG. 1, the securement mechanisms include two straps—upper strap 46 and lower strap 48. The two straps are secured to the outward facing surface of back panel 10. The straps in this example include elastic material so that they can be stretched, and allow for compression of the thermal packs against the user's body.

The free end of each strap includes a hook panel. These are hook panels 44, 50, 52, and 54. Loop panels 32, 34, 36, and 38 are provided on exterior surface 30 of left front panel 18 and right front panel 20. The vest is designed so that it can be adjusted by the user. One good approach to adjusting the vest is to first don the vest and then zip up zipper 40 to close vertical break 42. The user then pulls the two straps tight and presses the hook panels on the free ends of the straps against the loop panels on the outward facing surface of the vest. For example, the user might first secure hook panel 52 to right upper loop panel 36. The user would then draw the upper strap to a desired level of tightness before securing hook panel 44 to left upper loop panel 32.

Next, the user secures hook panel 54 to right lower loop panel 38. Then he or she secures hook panel 50 to left lower loop panel 34. The position of the hook panels can be iteratively adjusted to achieve a comfortable fit. Compression of the transfer packs against the body is desirable to obtain a suitable rate of heat transfer. The two lateral gaps in the vest allow a very wide range of adjustment An elastic functionality for straps 46, 48 is desired since this allows die user to stretch the straps and secure them—thereby providing a desired level of inward compression.

Ordinarily the straps will be disconnected each time the user removes the vest. Alternatively, once a comfortable fit is achieved, the hook panels may be left in place. The user then removes the vest by unzipping zipper 40 and secures it back in place (when desired) by using the zipper again.

Figure 2:
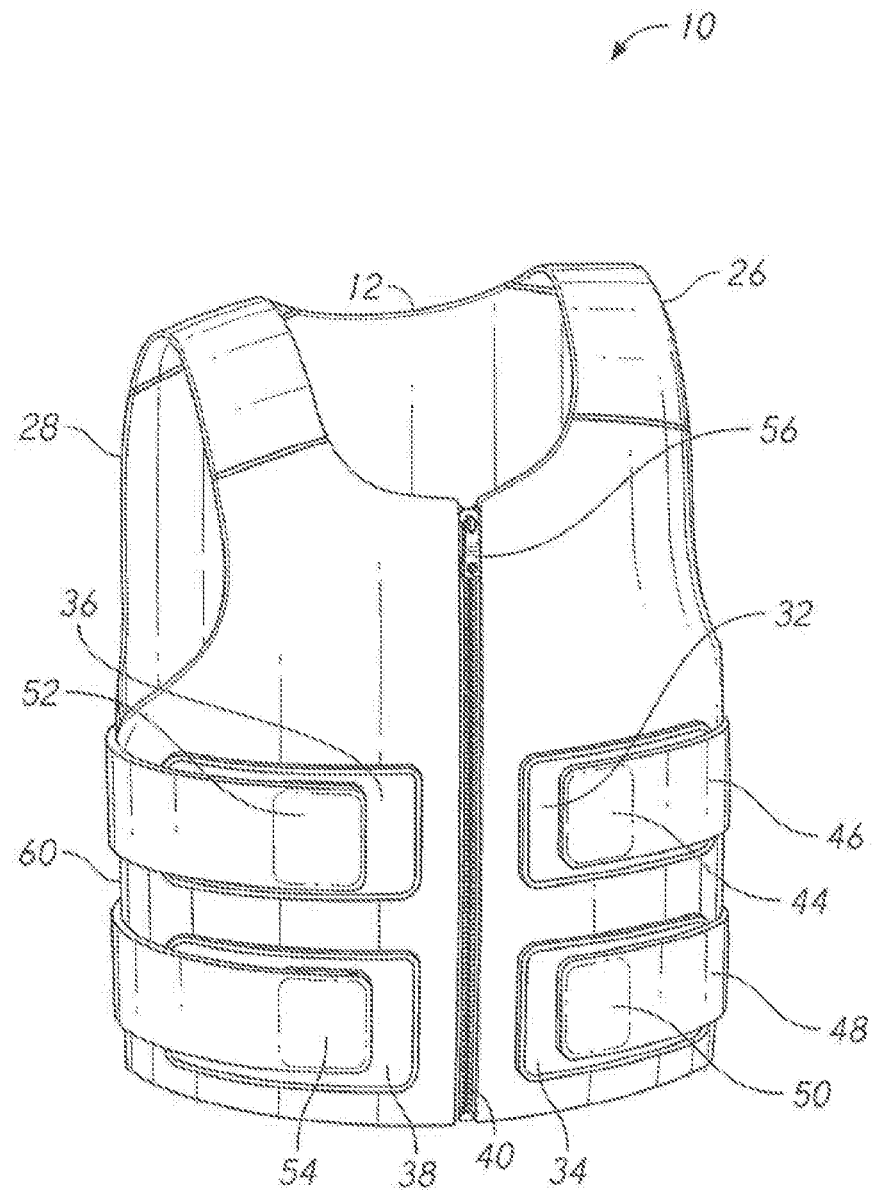
FIG. 2 is a perspective view, showing the inventive vest in a closed configuration as it would be worn by a user.

FIG. 2 shows heat transfer vest 10 after the adjustable securement mechanisms have been secured. The reader will observe that the lateral extensions have been overlapped to create overlap 60. For many individuals the overlap may not exist and in fact the lateral extensions on the front panels may not even reach the lateral extensions on the back panel. Neck relief 12 is provided for the user's neck. Left and right arm reliefs 26, 28 are provided for the user's arms. The reader will note that slider body 56 has been moved upward to its full extent in order to close zipper 40 and lock the two front panels together.

Figure 3:
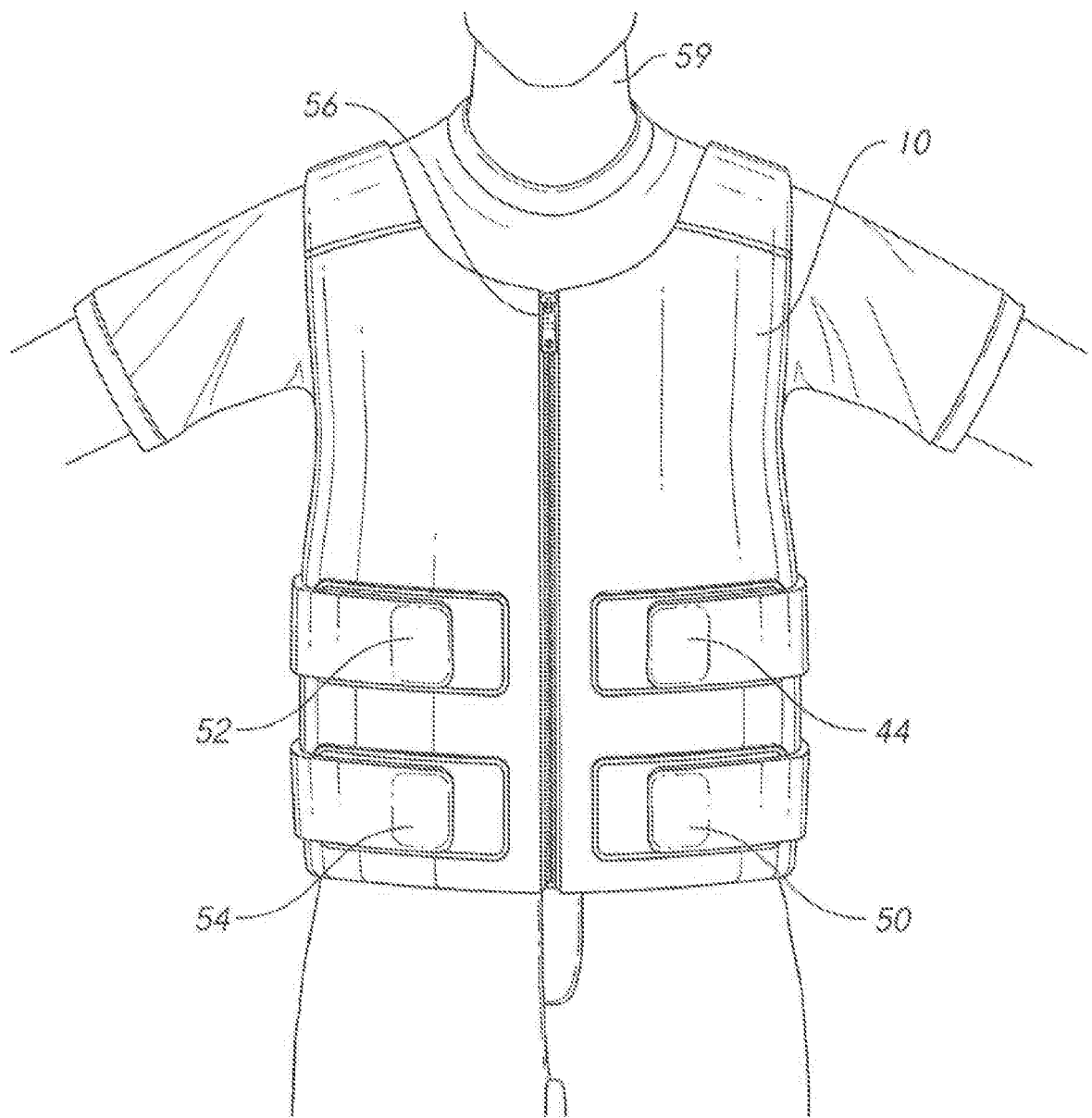
FIG. 3 is a perspective view, showing the inventive vest being worn by a user.

FIG. 3 shows the inventive vest being worn by user 59. The reader will observe how the neck and arm reliefs accommodate the user's anatomy. The straps in this version completely encircle the back of the vest. It is of course also possible to use four straps instead of two. Each hook panel would be mounted on its own individual strap. The end of each strap opposite its hook panel would be attached to the rear or five vest.

The neck and arm reliefs may be different for different applications. One application for the vest is a hot industrial environment. In this sort of environment a worker may need considerable freedom of movement. In such a case, the neck and arm reliefs may be enlarged to accommodate anticipated head and arm movements.

Figure 4:
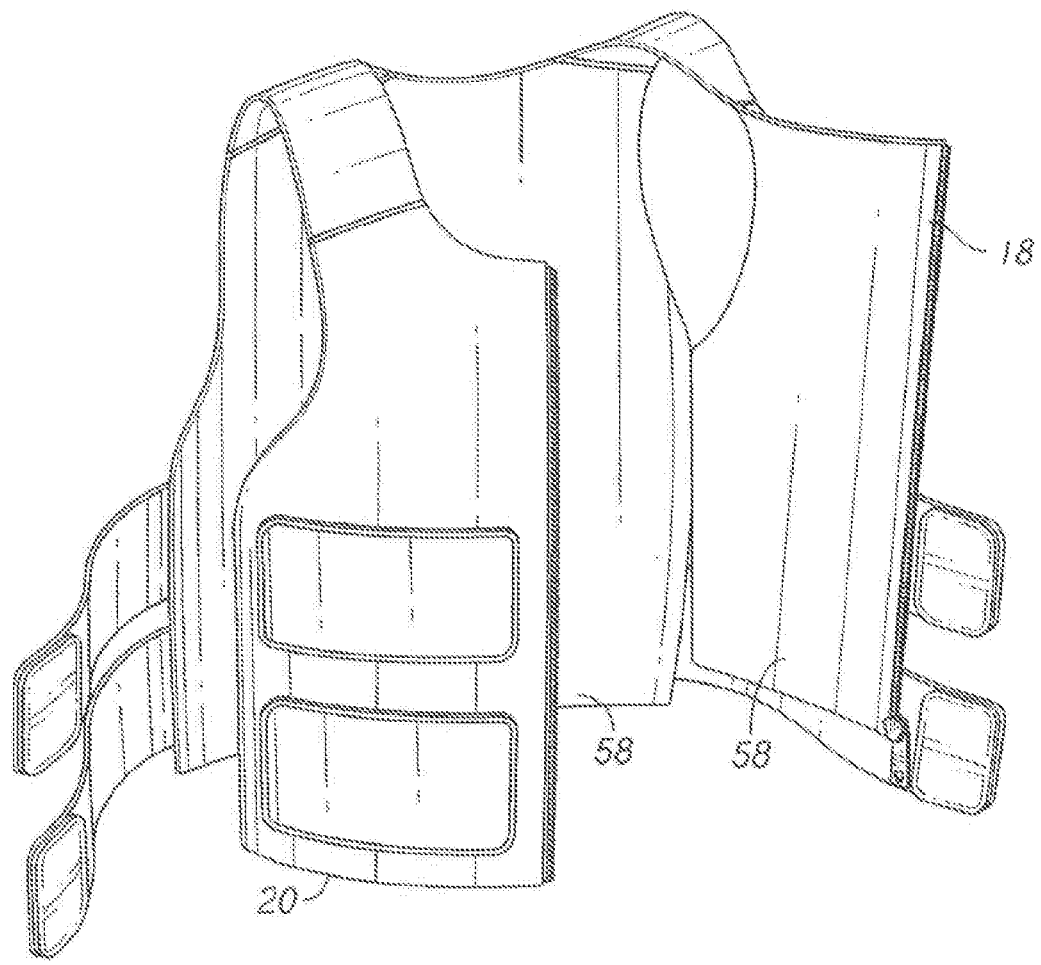
FIG. 4 is a perspective view, showing the inventive vest with the left aide rotated open so that both the interior and exterior surfaces can be viewed.

The inventive vest uses thermal transfer packs that are directly attached to its interior surfaces (as opposed to being placed in a pocket). FIG. 4 shows the same embodiment as depicted in FIGS. 1-3. However, in FIG. 4, the zipper has been unzipped and left front panel 18 has been urged open as shown. Interior surfaces 58 of the front panels and back panel are covered in loop material that is suitable for engagement by hook panels on the thermal transfer packs. It is not necessary to cover all of the interior surfaces, but the majority of these surfaces preferably are covered so that the thermal transfer packs can be placed in a variety of locations. As an example, the loop covering may be selectively omitted from the areas up near the yoke panels if the user does not desire to place a thermal transfer pack in those locations.

Figure 5:
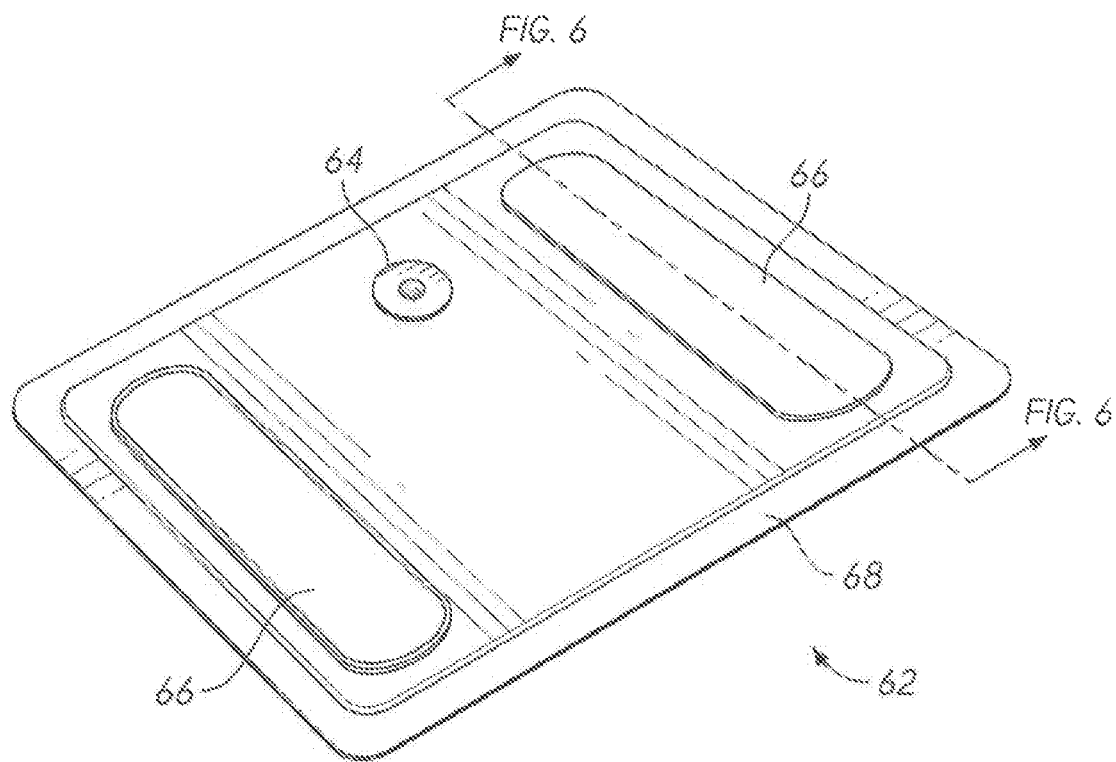
FIG. 5 is a perspective view, showing a thermal transfer pack as used in the present invention.
Figure 6:
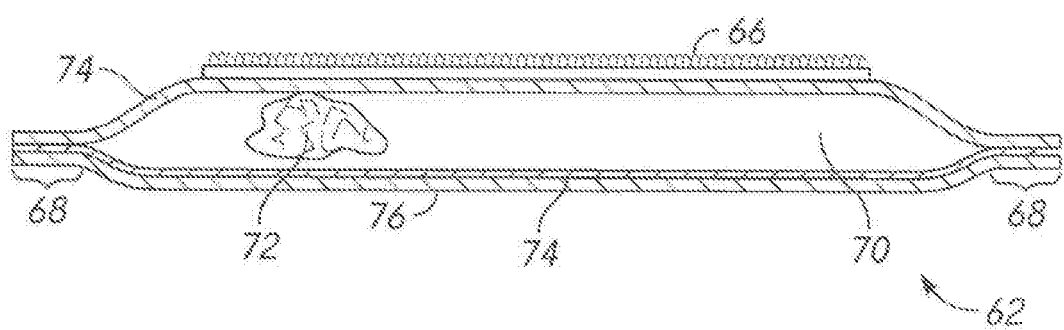
FIG. 6 is a sectional elevation view, showing the construction of the thermal transfer pick of FIG. 5.

FIGS. 5 and 6 illustrate exemplary embodiments for the thermal transfer packs used in the present invention. In FIG. 5, thermal transfer pack 62 includes two liquid-impermeable layers joined together along a sealed perimeter 68 to create an enclosed volume. Valve 64 provides a controlled passage from the exterior to the interior. The interior contains a heat transfer medium. This is preferably a hydrating liquid consisting of a solution of water and a humectant selected from the group consisting of propylene glycol, ethylene glycol, glycerin, dimethyl sulfoxide, dimethyl formamide, and combinations thereof (as described in the prior art section of this disclosure).

When this substance transitions to a solid it expands to a form that is similar to packed snow or crushed ice. Air is admitted to the interior through valve 64 during the freezing process. When the medium melts valve 64 allows air out of the enclosed interior but not the liquid medium. Hook panels 66 are provided to attach thermal transfer pack 68 to the interior surface of the inventive vest (via the loop covering thereon).

FIG. 6 shows a section view through thermal transfer pack 62. Two layers of sealing material 74 (the water impermeable layer) are staked together to form sealed perimeter 68. Each pack has an inward facing surface and an outward facing surface. The inward facing surface includes a layer of cover material 76. The cover material is preferably a soft and compliant material that may be comfortably worn against the user's thin clothing (such as a T-shirt) or even directly against the user's skin. This material preferably wicks moisture away from the user. One of its main purposes is to serve as a barrier separating the user from direct contact with the thermal transfer pack. The material thereby regulates the rate of heat transfer to a desired level.

Cover material 76 may be bonded to the thermal transfer pack by any suitable method—including adhesives or stitching. It is preferable for the side facing the user to have no exposed discontinuities as these may be irritating.

Heat transfer medium 72 is contained within interior 70 formed between the two layers of sealing material 74. Hook panel 66 is affixed to the outward-facing side of the assembly. The soft and pliable cover material 76 faces toward the user. Hook panel 66 faces away from the user and toward the loop covering on the inside of the vest.

Figure 7:
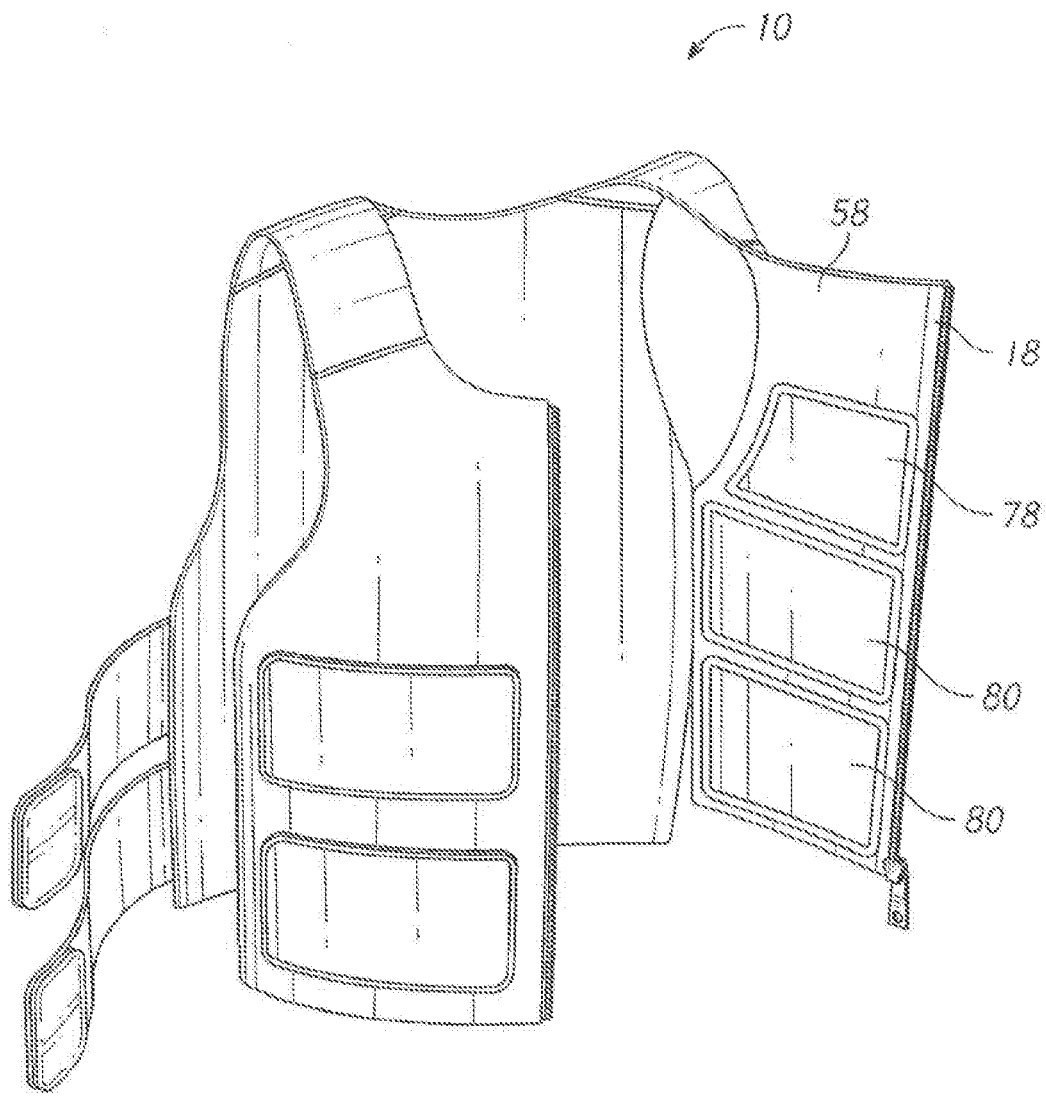
FIG. 7 is a perspective view, showing the application of thermal transfer packs to the inside of the left front panel.

FIG. 7 shows the inventive heat transfer vest 10 open as shown previously in FIG. 5. Three thermal transfer packs have been affixed to interior surface 58 of left front panel 18.

The thermal transfer packs may be shaped to conform to the available surface area on the vest's interior. In the example of FIG. 7, left upper side pack 78 (a particular shape for a thermal transfer pack) includes a cutaway conforming to the perimeter of left arm relief 26. The two side packs 80 are larger. They are simple rectangles as this shape conforms to the space available in the lower portion of left front panel 18.

Figure 8:
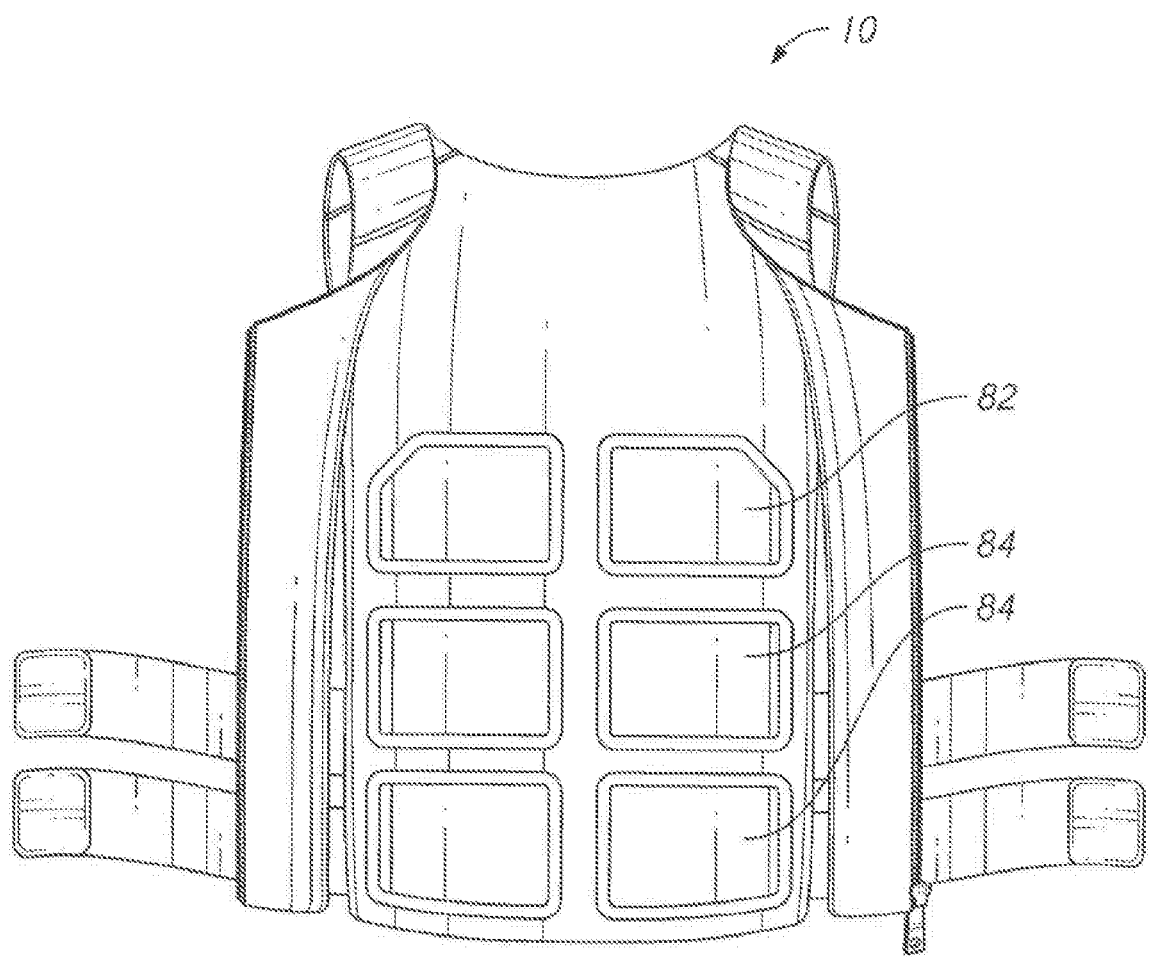
FIG. 8 is a perspective view, showing the application of thermal packs to the inside of the back panel.

FIG. 8 shows a front perspective view of the vest with both side panels folded away to show the interior surface of the back panel. Two upper back packs 82 (another shape for the thermal transfer pack) are affixed as shown. These packs include a cutaway near the upper outside corner to facilitate shoulder mobility. Four rectangular back packs 84 are also affixed as shown.

The use of the hook-and-loop connection between the thermal transfer packs and the vest means that the user may move the packs to many desired locations and may "customize" the configuration to suit his or her preferences. In some instances, however, it may be desirable to provide a "standard" placement for some of the packs.

Figure 9:
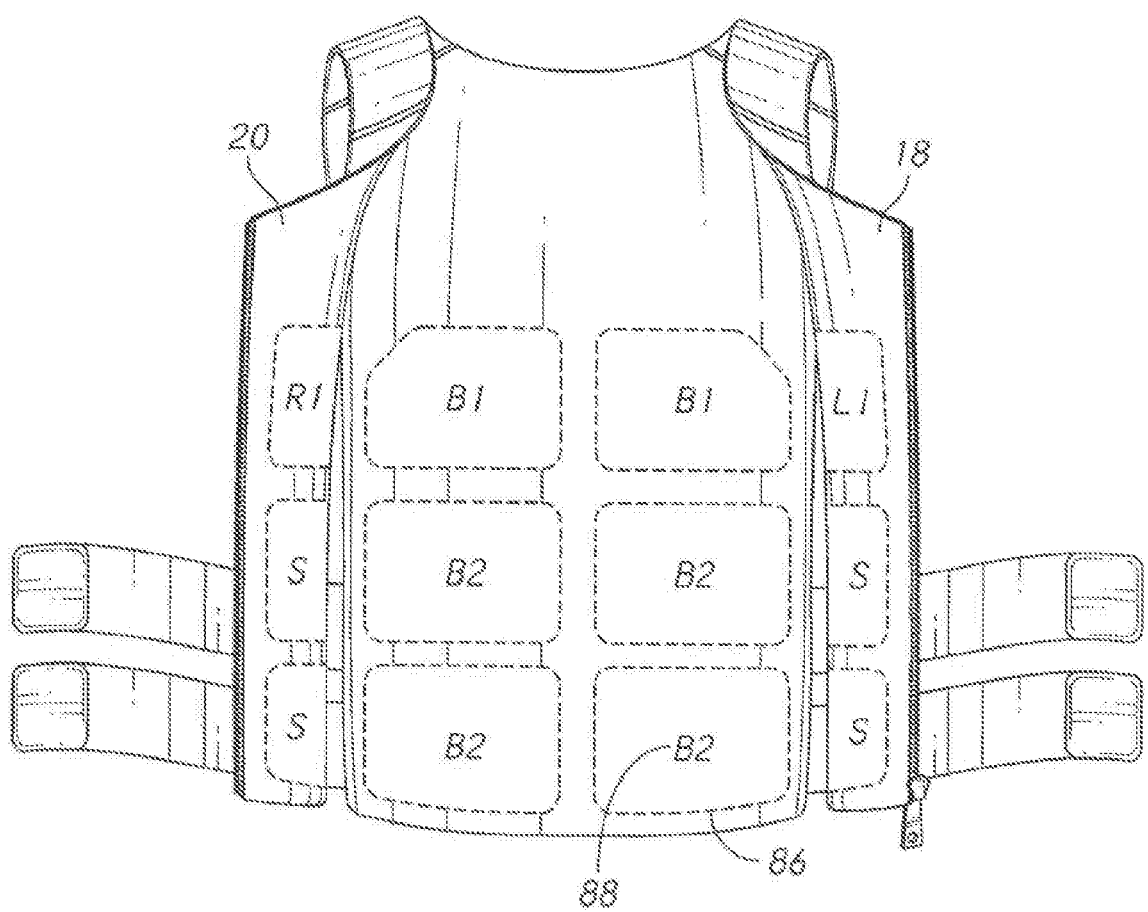
FIG. 9 is a perspective view, showing the use of outlines and labels on the interior surfaces of the vest to aid in the placement of the thermal transfer packs.

Standard locations may be marked on the vest's interior. FIG. 9 shows one way in which this may be done. Outlines 86 are screen printed as dashed lines on the interior. Other indicators of position may be used (such as indicating the location of the corners of each pack). Labels 88 may also be provided to indicate a particular type of thermal transfer pack that should be used in this location. The user may employ these outlines and labels to place some or all of the packs shown.

Once the desired thermal transfer packs are in position, the user may don the vest and adjust it for a suitable fit as shown in FIGS. 2 and 3. Some user may like a loose fit and some will want a tighter fit (a tighter fit is preferable from a heat transfer standpoint). Once the straps are adjusted, the fit can be maintained. The user employs the zipper to remove and replace the vest.

The use of the hook-and-loop fasteners makes replacement of the thermal packs easy and convenient. If the user is working in a hot environment (and therefore using thermal transfer packs intended to cool), the packs will need to be changed approximately every four hours. A fresh supply of replacement packs can be prepared in a freezer. The user takes off the vest, and lays it out as shown in FIG. 9. The user removes the packs on the vest and replaces them with new, frozen packs. The removed packs can then be placed in the freezer so that they will be ready at the next interval.

Figure 10:
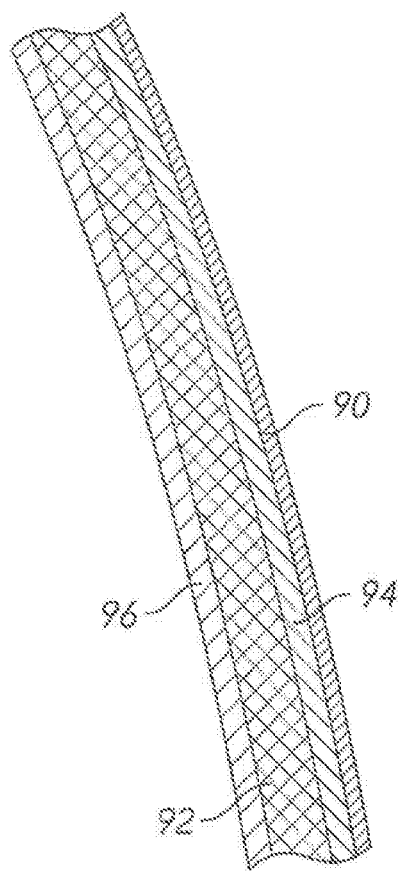
FIG. 10 is a sectional elevation view, showing a representative layering of materials for the inventive vest.

The inventive vest may incorporate other features to enhance its performance. FIG. 10 shows a section view through the vest. Multiple layers are employed in this example. Exterior layer 90 is preferably a tough fabric. It may also be water and fire resistant. Reflective layer 94 is provided adjacent to exterior layer 90 to reduce the heat transfer from the ambient environment to the thermal transfer packs. It preferably serves as a UV barrier. It may be a distinctive material—such as a thin metal foil. On the other hand, it may be a coating that is applied over one of the other layers. Insulating layer 92 provides cushioning and insolation. It may be made of foam or it may be made of quilted layers containing fiber-fill or other similar materials. Loop material 96 comprises the innermost layer.

Throughout this disclosure, the term "loop material" should be understood to mean any material that is compatible with a hook panel so that the hook panel will adhere to the loop material. The term encompasses traditional VELCRO loop material but it encompasses many other materials as well.

FIG. 11 shows an alternate embodiment of heat transfer vest 10 that is well suited to the treatment of multiple sclerosis ("MS") patients. MS patients benefit from the addition of cold therapy during exercise. However, MS patients often also suffer from digestive issues and the application of cold therapy to the abdomen is generally undesirable. In the embodiment of FIG. 11, the overall height of the vest is reduced so that lower edge 126 rests along the lower extreme of the wearer's rib cage.

MS patients may also benefit from additional cooling applied to the back of the neck and the lower posterior portions of the skull (other users may obviously benefit from cooling applied to these areas as well). Shawl collar 98 is provided in the version of the vest in FIG. 11. The shawl collar includes elevated posterior edge 100. Cranial cold pack 102 may be applied to interior surface 58 (as explained previously) just below elevated posterior edge 100.

The shawl collar preferably includes elastic functionality so that the cranial pack will be urged against the user's neck and head. The entire shawl collar may be made of elastic material (such as an elastic neoprene) or elastic panels may be provided in inelastic material.

Figure 12:
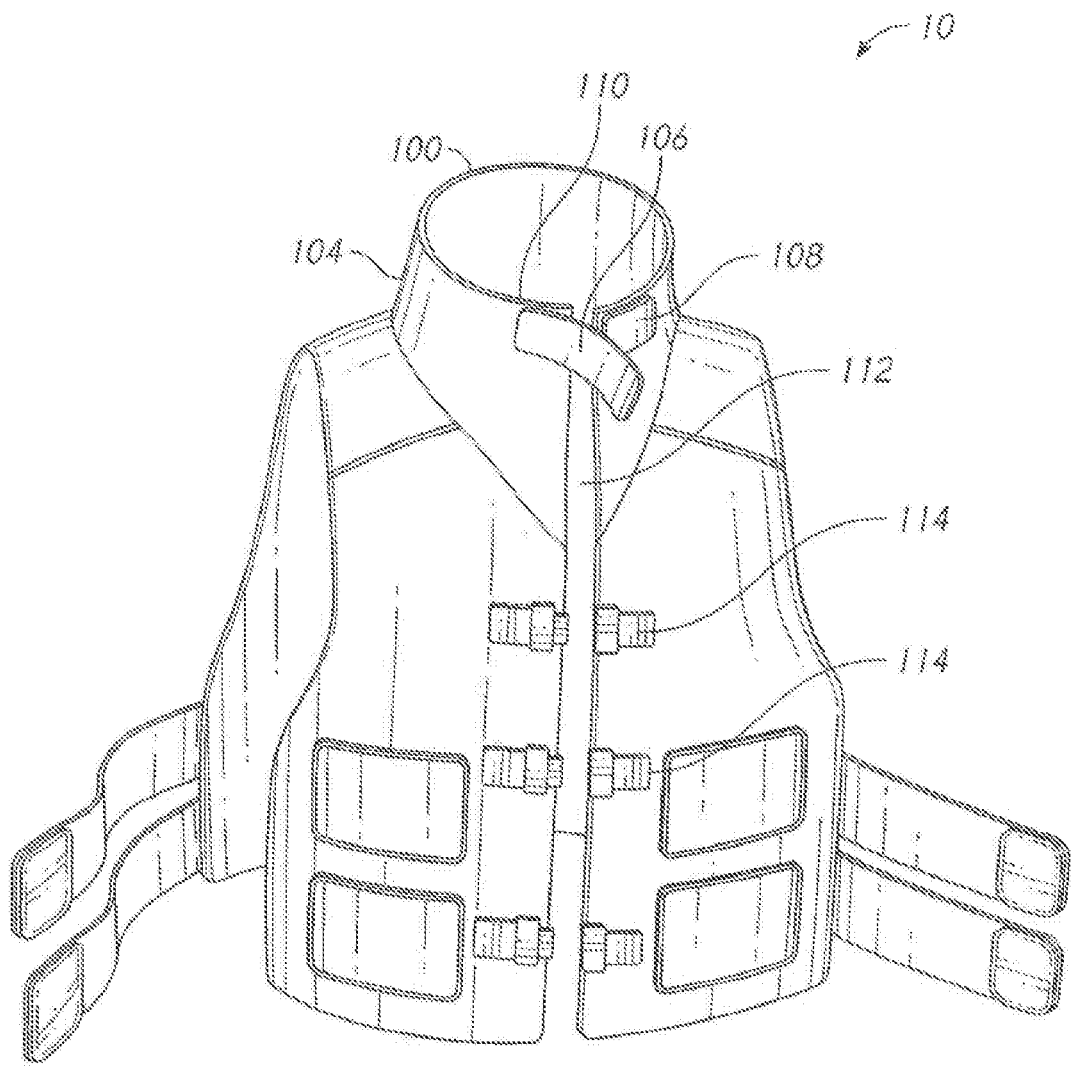
FIG. 12 is a perspective view, showing an alternate embodiment of the inventive vest with an elevated posterior and anterior neck portion.

FIG. 12 shows a third embodiment of the inventive vest. It has been demonstrated that heat transfer packs applied to the front of the neck can be quite effective, as these press against the carotid arteries supplying blood to the brain. The version shown in FIG. 12 features neck-covering collar 104. This collar includes a raised anterior sub-jaw edge 110 in addition to elevated posterior edge 100. The anterior portion includes an opening 112. The user may close this opening by pressing loop tab 106 against hook panel 108.

Figure 13:
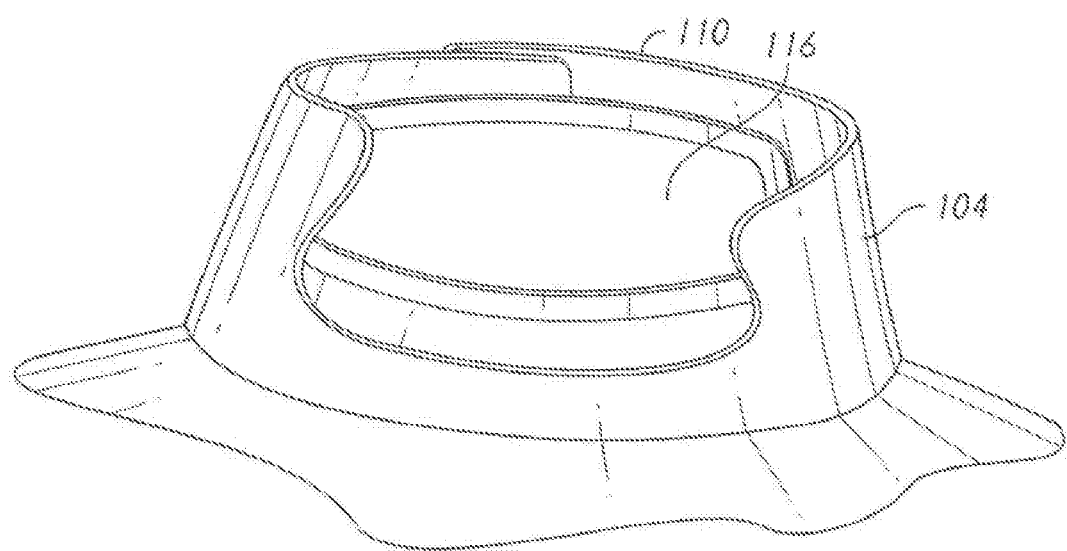
FIG. 13 is a rear perspective view with a cutaway, showing the placement of a carotid bag.

FIG. 13 shows a view of the same embodiment from the rear. The rear portion of neck-covering collar 104 has been cutaway to reveal the interior of the collar. Carotid bag 116 is attached to the interior surface of the anterior neck portion by pressing a book panel or panels on the carotid bag against a loop covering on the interior of the collar. The carotid bag may be applied with the collar still open. The user presses the bag against the left (interior) portion of the collar. The user then closes the right portion of the collar over the bag and presses the loop panel into place to secure it.

Returning again to FIG. 12, the reader will note that the closure device provided for the front of the vest in this embodiment includes if three snap closures 114 rather than a zipper. Any suitable closure mechanism can be used, including hook-and-loop panels, buttons, or buckles.

Figure 14:
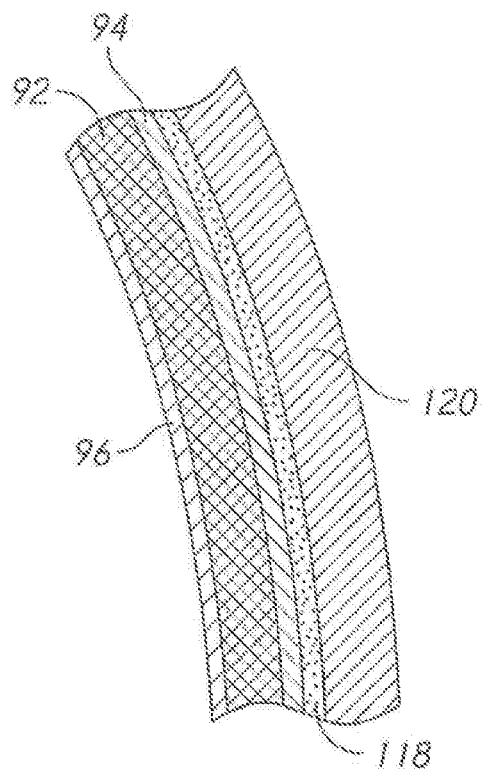
FIG. 14 is a sectional elevation view, showing an alternate representation of the layering of materials for the inventive vest.

FIG. 14 shows a section view through another alternate embodiment of the vest. Loop material 96, insulating layer 92, and reflective layer 94, and insulating later 96 are arranged as shown in the version of FIG. 10. However, waterproof layer 118 may be provided over insulating layer 96 (on the outside of the insulating layer). Evaporative layer 120 lies over the top of waterproof layer 118. The evaporative layer comprises a porous substance that can be wetted to retain water. The retained water then evaporates as external heat is applied to the vest. This provides an interval of evaporative cooling.

Waterproof layer 118 prevents the water in evaporative layer 120 seeping inward. Of course, as those skilled in the art will know, waterproof layer 118 may include materials that allow water to pass outward through the layer but prevent water passing inward. In use, the outside of the jacket can be wetted (such as by pouring or spraying). The outside may also be rewetted at intervals to prolong the evaporative cooling effect.

Any of the known evaporative cooling fabrics could be used for evaporative layer 120. In some embodiments, the vest could simply be constructed as an evaporative cooling layer 120 on the outside oi a layer of loop material 96. The vest in this instance would have cold packs affixed to the loop material and an evaporative cooling layer over the top. A single material could also be used for the evaporative cooling layer and the layer of loop material (which could then be made as a single layer).

Figure 15:
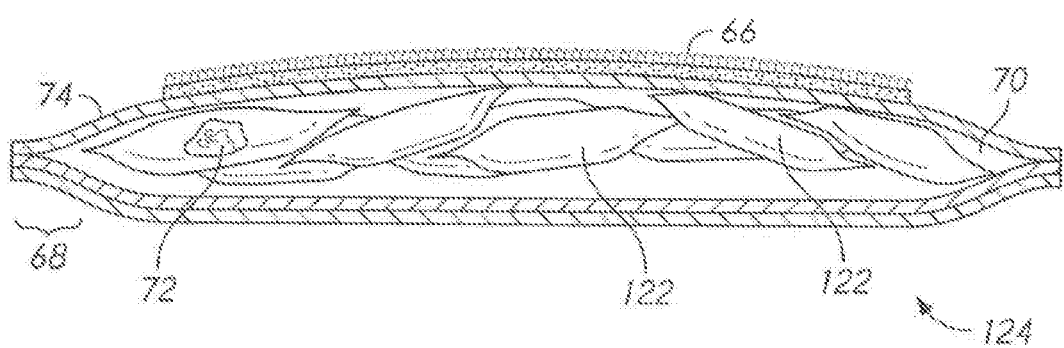
FIG. 15 is a sectional elevation view, showing the construction of an alternate thermal transfer pack using a plurality of sub-bags.

FIG. 15 shows an enhancement to the cooling pack described in FIG. 6. Rather than placing the cooling media in a single compartment, the version of FIG. 15 places several small bags of cooling media into a larger bag. Sub-bags 122 are relatively small—on the order of 1 to 2 inches square. In many instances it will be preferable to make them even smaller. Some embodiments will be 0.500 inches square. Still other embodiments will be 0.200 inches square.

As explained previously, the cooling media contained within interior 70 is preferably a substance such as shown in U.S. Pat. No. 5,800,491 to Kolen and Nebolon. This substance forms an organized crystalline solid with a consistency similar to snow. Evert as a solid, it remains soft and malleable. However, the substance such as disclosed in the '491 Patent does not absorb as much energy during the transition from a solid to a liquid as pure water. Water can absorb more thermal energy, yet water has an undesirable property in that it solidifies into a hard mass (ice). If bag 124 were simply filled with water and frozen, the result would be a rigid object that would be quite uncomfortable to wear.

The construction of FIG. 15 provides the advantageous latent heat of water while retaining most of the beneficial aspects of the substance described in the '491 Patent. Each sub-bag 122 is filled with water. Small amounts of Oliver substances may be present as well, but water is by far the main constituent. The volume contained within interior 70 but outside sub-bags 122 is filled with a substance that creates a snow-like solid (such as described in the '491 Patent). The result is an advantageous combination of features. Each individual sub-bag 122 freezes into a hard object (containing ice). The surrounding volume freezes into a malleable snow-like substance. The sub-bags are relatively small—preferably less than 3 cm on a side. Thus, the overall thermal transfer bag 124 can still bend and flex because the sub-bags 122 can move about within the snow-like frozen substance surrounding them. The user employs the composite bag 124 in the same way. However, the composite nature of the bag allows a greater absorption of thermal energy for the same unit volume.

In some versions of the composite thermal transfer bag the sub-bags or outer bag can include a thermochromatic material. This material changes color when the media freezes—thereby clearly indicating to the user whether all the sub-bags are fully transitioned to a solid. In some versions a thermochromatic ink may be added to the water within sub-bags 122. In other versions, the thermochromatic material will be a film added to the sub-bags, the overall bag, or both.

Figure 16:
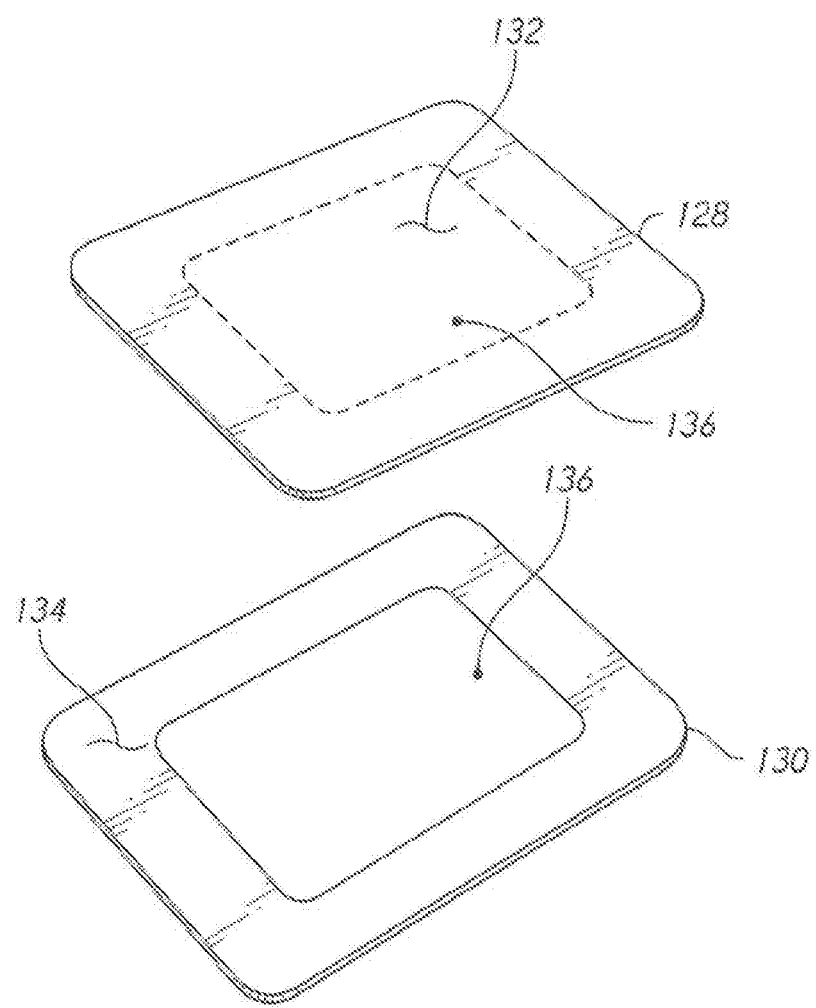
FIG. 16 is an exploded perspective view, showing the components that are used to create a temperature-indicating sub bag.
Figure 17:
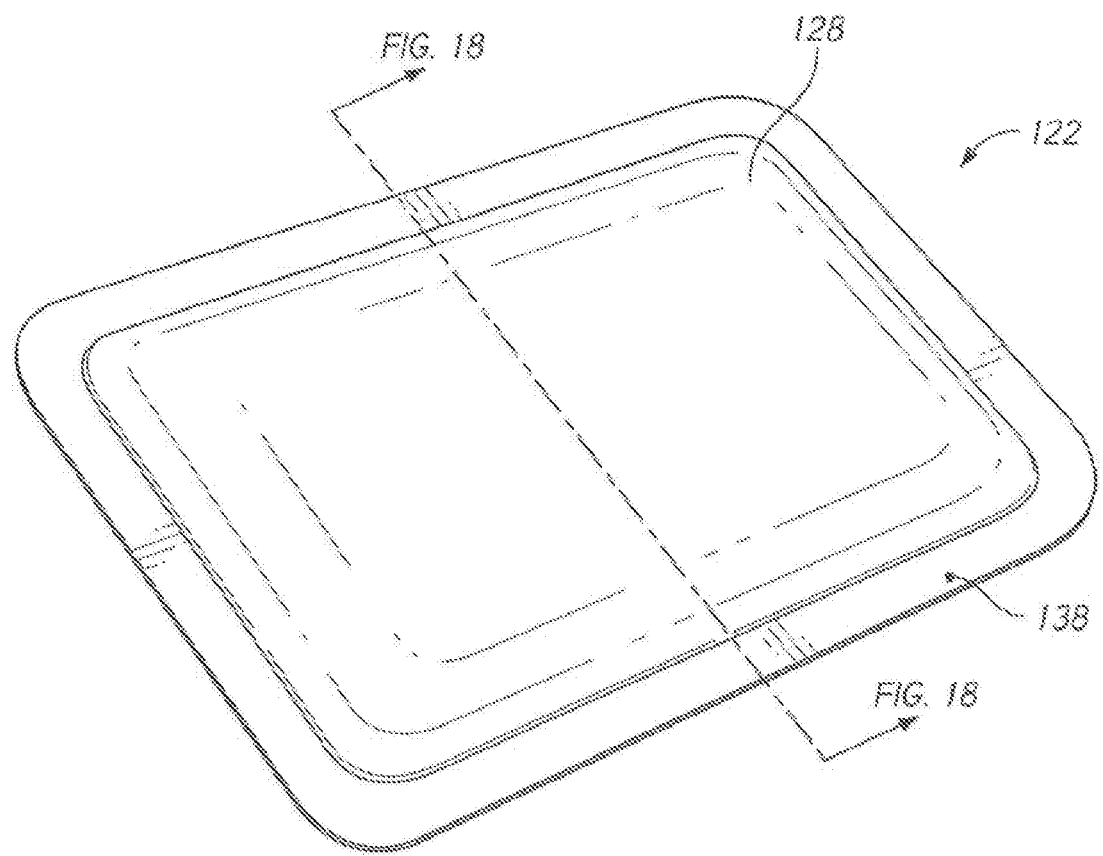
FIG. 17 is a perspective view, showing a temperature indicating sub bag.

FIGS. 16-20 show a preferred embodiment employing thermochromic materials to indicate when the water in the sub-bags is frozen. FIG. 16 depicts an individual sub-bag in a disassembled state. First panel 128 is configured to join second panel 130 by joining the perimeter of the two panels together to form a continuous seal (such as by heat, fusing or ultrasonic welding). FIG. 17 shows the two panels joined together to form sub bag 122. The bag is filled with water. Sealed perimeter 138 is formed around the perimeter of the two panels so that the water cannot escape.

The present invention is by no means limited to any particular method for making the sub bags, and in fact the sub bags may be made using many different methods and materials. One approach is to fold a single piece of flexible material over on itself. One "sealed edge" is created by the fold and the remaining three edges may then be sealed using a suitable method. Another approach is to cut lengths from a continuous tube of flexible material (possibly stored on a roll). The two cut ends can then be sealed using a suitable method.

The operation of sub bag 122 is quite simple. When the sub bag is exposed to temperatures below 0 degrees centigrade for a sufficient period the water within the bag freezes. As is widely known, water displays the unusual characteristic of expanding as it transitions from a liquid to a solid. The material used for the panels 128, 130 is preferably sufficiently elastic to accommodate many freezing and thawing cycles without breaking down. Another option is the inclusion of an air pocket within the sub bag so that the volumetric change is accommodated by varying air pressure. Yet another option is including some type of air valve. However, it is preferable to maximize the heat transfer to and from the bag and to minimize complexity. Thus, the preferred embodiments contain plain water and do not incorporate any sort of valve. The term "plain water" shall mean pure water and solutions in which water makes up 95 percent of the total solution by mass. In some embodiments a small amount of other material may be added to the water to adjust the freezing point, to inhibit growth of organic materials, or for some other purpose. However, the other material shall not exceed 5% of the total solution by mass.

Returning to FIG. 16, the reader will note that the two panels 128, 130 each have an outer surface 132 and an inner surface 134 (referring to the inner and outer surfaces that will result once the two panels are joined together). Each of the two panels 128, 130 also has an indicating area 136. The indicating area may be located on an inner surface, an outer surface, or both (and may in fact comprise the entire surface). However, in the embodiment shown, indicating area 136 is located on the inner surface of each panel.

Indicating area 136 preferably includes a thermochromic material applied to the surface of the panel. The thermochromic material preferably changes color at a set point that indicates a complete freezing of the water within the bag. As an example, the set point might be −2 degrees centigrade. At this point the thermochromic material can be configured to change from clear to opaque (such us a medium blue color). When a user sees this color, it indicates that the contents of the particular sub bag have completely frozen. Certain other thermochromic materials may change from one color to another color (such as white to indigo).

A thorough discussion of thermochromic materials is beyond the scope of this disclosure. However, an exemplary choice is a leuco dye secured in microcapsules. Commonly used leuco dyes include spriolactones, fluorans, spiropyrans, and fulgides. The microcapsule containing the dye is a small enclosed volume that retains the dye without leakage. The encapsulating material is thermally conductive so that the surrounding temperature is quickly assumed by the leuco dye within the microcapsule. Because the mass of leuco dye within each microcapsule is very small, it can change temperature rapidly. These microcapsules can be adhered to the inner surfaces of the panels 128, 130. A sufficiently dense array of such microcapsules will be in contact with the water within the sub bag.

Those skilled in the art will know that leuco dye microcapsules can be printed on a surface or sprayed on a surface.

They may even be embedded in the material itself as it is manufactured, Leuco dyes are known to have limited accuracy in their indication, since the color change usually occurs in about a 3 degree centigrade band. With this in mind, one could select a leuco dye that transitioned to the opaque state between −1 and −4 degrees centigrade. With such a selection, the dye would reliably indicate the frozen state.

Those skilled in the art will also know that liquid crystal thermochromic agents generally have a better temperature accuracy than leuco dyes. One could employ liquid crystal materials though this would likely drive up the cost and limit the color choices. The present invention is by no means limited to any particular thermochromic agent, nor is it limited to any particular method of applying the thermochromic agent.

As an example, one may consider an embodiment where the sub-bags are made from a long length of flexible tube. The tube may be cut at suitable intervals to create a short, tubular section, with two open ends. The two open ends are sealed to form the sub-bag. In this example the leuco dye may be a printed continuously along the entire inward-facing surface of the flexible tube. The result is that the inward-facing surface of the sub-bag is covered by the leuco dye. From the user's perspective, the entire sub-bag will appear to include the leuco dye. Thus, the color change will appear to be the entire sub-bag.

Figure 18:
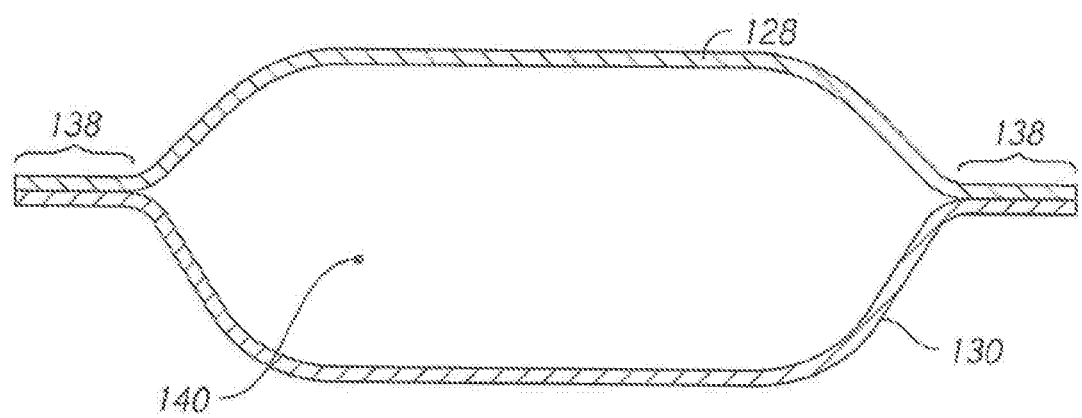
FIG. 18 is a sectional elevation view, showing the construction of a temperature indicating sub bag.

FIG. 17 provides a perspective view of sub bag 122 filled with water. FIG. 18 provides a sectional elevation view through the bag depicted in FIG. 17. A volume of water 140 is trapped between the panels 128, 130 and contained by sealed perimeter 138. The thermochromic agent is preferably placed on the inner surface of each panel so that it has more direct contact with the water.

Figure 19:
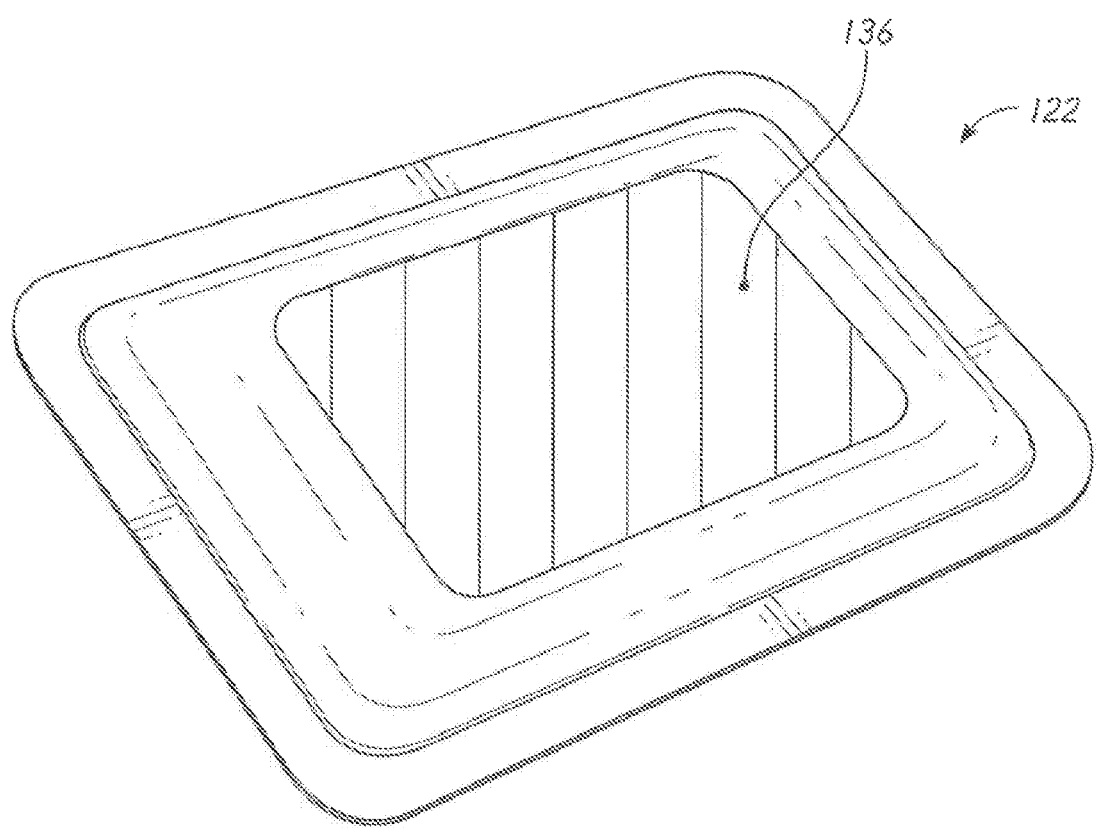
FIG. 19 is a perspective view, showing a temperature indicating sub bag with the indicating area in an active state.

FIG. 19 shows a perspective view of the same sub bag 122 after the thermochromic material has transitioned to an opaque state. The material selected for panels 128, 130 should be transparent or semi-transparent if the thermochromic material is placed on the inner surface of the panels. In the example of FIG. 19 the material of the panels is transparent and the thermochroic material is deposited on the inner surface of the panels. Indicating area 136 is visible from the exterior of the sub fog as shown. The indicating area is depicted as a cross-hatched area. In reality, the indicating area will appear as an opaque region. For example, if a medium blue thermochromic agent is used, then indicating area 36 will appear as a blue rectangle on the panels (and the user will likely not perceive the fact that the thermochromic agent is on the inner surface but will instead just perceive the appearance of a blue rectangle on the visible outer surface).

Figure 20:
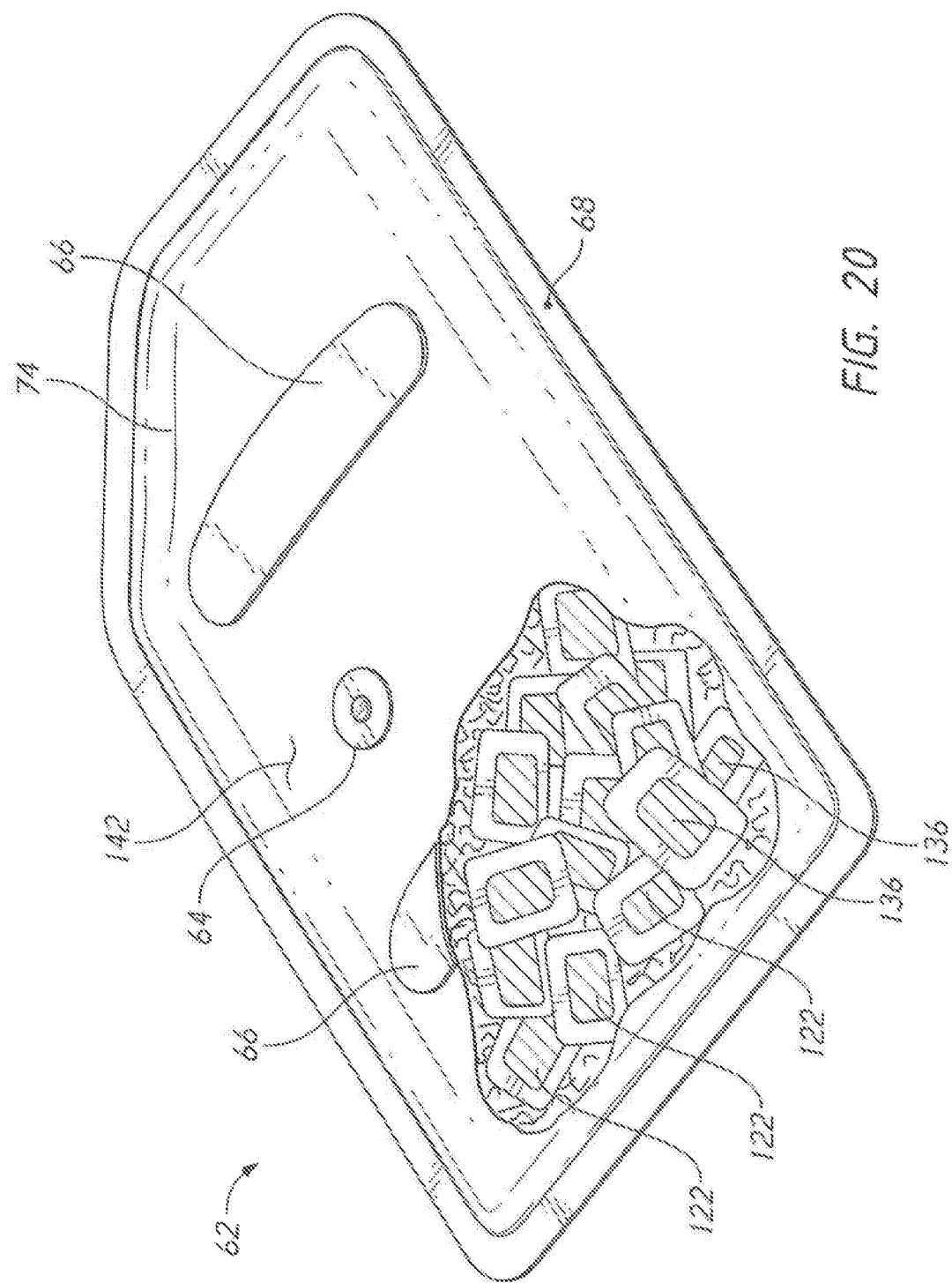
FIG. 20 is a perspective view with a cutaway, showing a thermal transfer pack made according to the present invention.

As explained previously, the inventive thermal transfer pack places a plurality of sub bags 122 into a larger bag. FIG. 20 shows a thermal transfer pack 62 made by placing a number of sub bags 122 and surrounding heat transfer medium into a sealed bag. A cutaway is included in the view to clearly show sub bags 122.

The sub bags are surrounded by a beat transfer medium that freezes into a highly crystalline structure akin to snow. As also explained previously, the surrounding heat transfer medium is preferably a composition of discrete hydrophilic absorbers that are hydrated with a liquid comprising a solution of water and a humectant selected from the group consisting of propylene glycol, ethylene glycol, glycerin, dimethyl sulfoxide, dimethyl formamide, and combinations thereof. The hydrophilic absorbers are discrete acrylic polymer granules, such as discrete cross-linked polyacrylamide copolymer granules. Upon freezing, this composition creates a solid state that is akin to packed snow or crushed ice. It remains pliable instead of freezing into a unified solid mass (see U.S. Pat. Nos. 5,800,491 and 9,039,747 to Nebolon and Gardner).

The composition has been previously referred to as a "heat transfer medium." In the context of the inventive duplex thermal transfer pack the use of the term "heat transfer medium" is a bit vague, since both the water and the mixture of hydrophilic absorbers and water with a humectant as a "heat transfer medium." Accordingly, the water and humectant solution shall be referred to as a solid-pliable heat transfer medium in the context of the duplex thermal transfer pack. A solid-pliable heat transfer medium is one which remains pliable after the water it has contained transitions from a liquid to a solid.

Sealing material 74 used in the creation of thermal transfer pack 62 has a transparent surface 142 that allows the user to see the condition of the sub bags within. A user typically places thermal transfer pack 62 in a freezer for a long enough period to convert the heat transfer medium to a crystalline solid and to freeze die water within the sub bags 122. The user can visually confirm the freezing of the water in the sub bags by noting the change of color on the indicating areas 136 on the sub bags (the areas containing the thermachromic material). Transparent surface 142 must be sufficiently clear to allow a user to perceive the color change of the sub bags that are pressed up against the other side of the surface. A thin and clear plastic material is sufficient.

The transparent surface may only extend for part of one side of the bag, or it may extend for more than that. In the example of FIG. 20, portions of transparent surface 142 axe covered by hook panels 66. The hook panels am used to affix the thermal transfer pack to another item—such as a vest or a knee brace. Other portions of the transparent surface may be covered by valve 64.

The far side (the side not visible to the user) of the thermal transfer pack shown in FIG. 20 may include a cover material 76 as depicted in the example of FIG. 6. This cover material may provide some insulating value to regulate the transfer of heat from a user to the thermal transfer pack. It may also be smooth and pliable in order to be comfortable next to the user's skin.

The example shown in FIG. 20 is referred to as a "duplex" thermal transfer pack because it contains two different heat-absorbing materials. Sub bags 122 contain water, whereas the volume within thermal transfer pack 62 lying outside the sub bags contains a solution of water and a humectant. Water is an ideal heat-absorbing material because it can be easily frozen with readily available cooling devices and because it has a relatively high latent heat. The phase change of the water within the sub bags from a solid to a liquid absorbs a substantial amount of heat. Thus, from a thermodynamic standpoint, one might wish to use only water in thermal transfer pack 62.

However, water freezes into a hard and solid block of ice. A thermal transfer pack 62 containing only water would freeze into a solid "slab" that would be uncomfortable when placed next to a user. On the other hand, a thermal transfer pack 62 containing only a solution of water and a humectant would have a significantly reduced thermal absorption capacity. The present invention creates a compromise that retains the benefit of both constituents.

Most of the volume within thermal transfer pack 62 is consumed by the sub bags 122. Each sub bag is relatively small compared to the thermal transfer pack as a whole, however. Preferably, the longest dimension of a sub bag is less than ⅓ of the longest dimension of the thermal transfer pack as a whole. Even more preferably the longest dimension of a sub bag is less than 1/10 of the longest dimension of the thermal transfer pack as a whole.

As an example, the thermal transfer pack of FIG. 20 might have a longest dimension of 28 cm. A sub bag 122 used in this example might have a longest dimension of 2.5 cm. The sub bags are preferably pillow-shaped. In this example, the sub bag dimension are 1.25 cm×2.5 cm×0.50 cm. When the thermal transfer pack is placed in the freezer, the sub bags freeze into hard little "plates." The surrounding solution of water and a humectant freezes into a crystalline structure resembling packed snow. It remains soft and malleable. Because the now-hard sub bags are small in comparison to the overall volume of the thermal transfer pack—and because the interstices between the sub bags are packed with the soft "snow"—the thermal transfer pack as a whole retains a soft and malleable feel.

It is preferable to concentrate as much of the total mass of the pack as possible in the sub bags—since they contain plain water and have a greater latent heat. In the preferred embodiments the mass of the sub bags in total exceeds the mass of the solid-pliable heat transfer medium.

The relative sizes of the sub bags and the thermal transfer pack can be adjusted to suit each application. Other options for the present invention include:

1. Sub bags having non-uniform sizes within a single thermal transfer pack;
2. The water within the sub bags including a freezing point suppressant or other additional ingredient to alter its properties;
3. The transparent surface in the thermal transfer pack being a small "window" that is just large enough to allow a user to observe the color change of the thermochromic material; and
4. The use of thermochromic material on the sealing material of the thermal transfer pack in addition to or instead of the thermochromic material on the sub bags.

The inventive duplex thermal transfer pack may be used in any situation where it is advantageous to transfer heat from another object to the pack. A common application is "cold therapy" where cold packs are applied to the human body for various purposes. The duplex thermal transfer pack may be easily adhered to a loop-covered surface such as may be provided on the inward facing side of a knee brace, a back brace, or a vest.

Although the preceding descriptions present considerable detail they should be properly viewed as illustrating preferred embodiments of the present invention rather than limiting the scope of the invention. Many more embodiments following the same principles will occur to those skilled in the art. Accordingly, the scope of the invention should be fixed by the following claims rather than by the examples given.

Having described my invention, I claim:

1. A duplex thermal transfer system for a user, comprising:
   (a) a plurality of sealed bags each having an interior;
   (b) a plurality of sub bags contained within said interior of each of said sealed bags;
   (c) wherein each of said sub bags contains plain water;
   (d) an interstitial volume within said interior of each of said sealed bags but outside said sub bags;
   (e) wherein said interstitial volume in each of said sealed bags is filled with a solid-pliable heat transfer medium;
   (f) wherein said sub bags are unattached to said sealed bag in which said sub bags reside and to each other, leaving them free to move within said sealed bag in which said sub bags reside;
   (g) a vest, said vest having a left front panel, a right front panel, and a back panel;
   (h) said left front panel, said right front panel, and said back panel each having interior surfaces covered in loop material, said interior surfaces being innermost surfaces of said vest;
   (i) each of said sealed bags having an outward facing surface and an inward facing surface;
   (j) said outward facing surfaces of said sealed bags each having a hook panel;
   (k) a first of said sealed bags being attached to said interior surface of said left front panel by an engagement between a first of said hook panels on said first of said sealed bags and said loop material on said interior surface of said left front panel, said first of said sealed bags being in an arbitrary position and orientation with respect to said interior surface of said left front panel;
   (l) a second of said sealed bags being attached to said interior surface of said back panel by an engagement between a second of said hook panels on said second of said sealed bags and said loop material on said interior surface of said back panel, said second of said sealed bags being in an arbitrary position and orientation with respect to said interior surface of said back panel; and
   (m) a third of said sealed bags being attached to said interior surface of said right front panel by an engagement between a third of said hook panels on said third of said sealed bags and said loop material on said interior surface of said right front panel, said third of said sealed bags being in an arbitrary position and orientation with respect to said right front panel.

2. The duplex thermal transfer system as recited in claim 1, further comprising a heat-transfer-reducing cover material on said inward facing surface of each of said sealed bags.

3. The duplex thermal transfer system as recited in claim 1, further comprising:
   (a) said vest includes a shawl collar with an elevated posterior edge, said shawl collar being permanently attached to said vest;
   (b) said shawl collar has an interior surface; and
   (c) one of said sealed bags is attached to said interior surface of said shawl collar proximate said elevated posterior edge.

4. The duplex thermal transfer system as recited in claim 1, further comprising an area of thermochromic material on each of said sub bags configured to change in appearance when said plain water within said each of said sub bags has frozen.

5. The duplex thermal transfer system as recited in claim 4, wherein:
   (a) each of said sub bags includes a first panel having an inner surface; and
   (b) said indicating area is located on said inner surface of said first panel.

6. The duplex thermal transfer system as recited in claim 4, wherein each of said sealed bags includes a transparent surface through which said indicating areas on said sub bags can be seen.

7. The duplex thermal transfer system as recited in claim 1, wherein said solid-pliable heat transfer medium comprises:
   (a) discrete hydrophilic absorber granules; and
   (b) a solution of water and a humectant.

8. The duplex thermal transfer system as recited in claim 7, wherein said humectant is selected from the group consisting of propylene glycol, ethylene glycol, glycerin, dimethyl sulfoxide, dimethyl formamide, and combinations thereof.

9. The duplex thermal transfer system as recited in claim 3, comprising:
 (a) said shawl collar includes a sub jaw edge; and
 (b) one of said sealed bags is attached to said interior surface of said shawl collar proximate said sub jaw edge.

10. The duplex thermal transfer system as recited in claim 7, wherein:
 (a) all of said sub bags in combination have a first mass;
 (b) said solid-pliable heat transfer medium has a second mass; and
 (c) said first mass is greater than half of said second mass.

11. A duplex thermal transfer system for a user, comprising:
 (a) a plurality of sealed bags having an interior;
 (b) a plurality of sub bags contained within said interior of each of said sealed bags;
 (c) wherein each of said sub bags contains plain water;
 (d) each of said sealed bags including a valve configured to allow air to pass into and out of said sealed bag;
 (e) a solid-pliable heat transfer medium contained within said interior of each of said sealed bags but outside of said sub bags;
 (f) wherein said sub bags are unattached to said sealed bag in which said sub bags reside and unattached to each other, leaving them free to move within said sealed bag in which said sub bags reside;
 (g) a vest having a left front panel, a right front panel, and a back panel;
 (h) said left front panel, said right front panel, and said back panel each having interior surfaces covered in loop material, said interior surfaces being innermost surface of said vest;
 (i) each of said sealed bags having an outward facing surface and in inward facing surface;
 (j) said outward facing surfaces of said sealed bags each having a hook panel;
 (k) a first of said sealed bags being attached to said interior surface of said left front panel by an engagement between a first of said hook panels on said first of said sealed bags and said loop material on said interior surface of said left front panel, said first of said sealed bags being in an arbitrary position and orientation with respect to said interior surface of said left front panel;
 (l) a second of said sealed bags being attached to said interior surface of said back panel by an engagement between a second of said hook panels on said second of said sealed bags and said loop material on said interior surface of said back panel, said second of said sealed bags being in an arbitrary position and orientation with respect to said interior surface of said back panel; and
 (m) a third of said sealed bags being attached to said interior surface of said right front panel by an engagement between a third of said hook panels on said third of said sealed bags and said loop material on said interior surface of said right front panel, said third of said sealed bags being in an arbitrary position and orientation with respect to said right front panel.

12. The duplex thermal transfer system as recited in claim 11, further comprising a cover material on said inward-facing side of said sealed bags.

13. The duplex thermal transfer system as recited in claim 11, further comprising:
 (a) said vest includes a shawl collar with an elevated posterior edge, said shawl collar being permanently attached to said vest;
 (b) said shawl collar has an interior surface; and
 (c) one of said sealed bags is attached to said interior surface of said shawl collar proximate said elevated posterior edge.

14. The duplex thermal transfer system as recited in claim 11, wherein each of said sealed bags has a transparent surface through which a thermochromic indicating area on said sub bags can be seen.

15. The duplex thermal transfer system as recited in claim 14, wherein:
 (a) each of said sub bags includes a first panel having an inner surface; and
 (b) said thermochromic indicating area is located on said inner surface of said first panel.

16. The duplex thermal transfer system as recited in claim 14, wherein said transparent surface covers a portion of one side of each of said sealed bags.

17. The duplex thermal transfer system as recited in claim 11, wherein said solid-pliable heat transfer medium comprises:
 (a) discrete hydrophilic absorber granules; and
 (b) a solution of water and a humectant.

18. The duplex thermal transfer system as recited in claim 17, wherein said humectant is selected from the group consisting of propylene glycol, ethylene glycol, glycerin, dimethyl sulfoxide, dimethyl formamide, and combinations thereof.

19. The duplex thermal transfer system as recited in claim 13, comprising:
 (a) said shawl collar includes a sub jaw edge; and
 (b) one of said sealed bags is attached to said interior surface of said shawl collar proximate said sub jaw edge.

20. The duplex thermal transfer system as recited in claim 17, wherein:
 (a) all of said sub bags in combination have a first mass;
 (b) said solid-pliable heat transfer medium has a second mass; and
 (c) said first mass is greater than half of said second mass.

* * * * *